July 29, 1941.   H. G. ADLER   2,250,983
GOVERNOR
Filed May 6, 1940   3 Sheets-Sheet 2

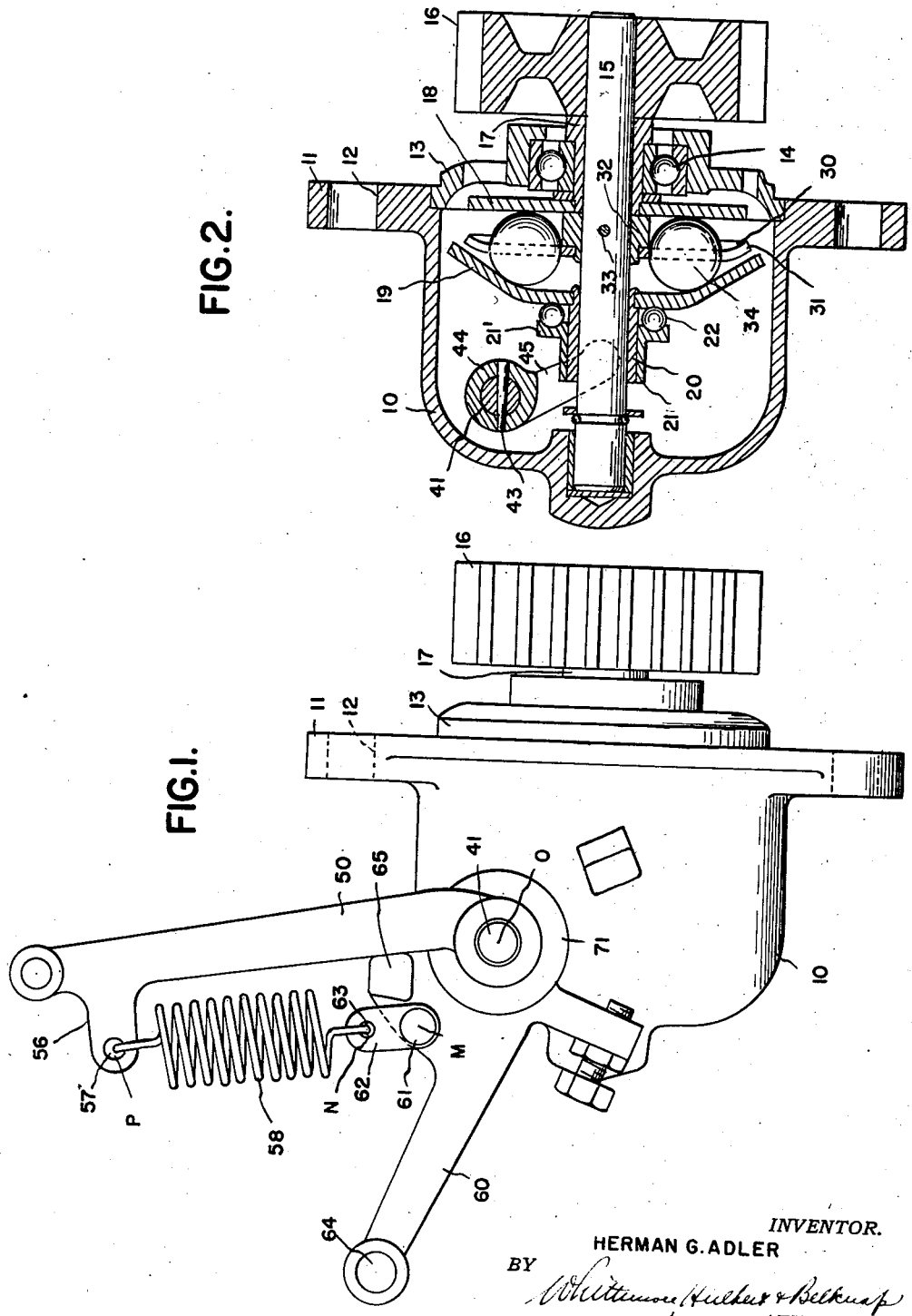

INVENTOR.
HERMAN G. ADLER
BY
ATTORNEYS

July 29, 1941. H. G. ADLER 2,250,983
GOVERNOR
Filed May 6, 1940 3 Sheets-Sheet 3

INVENTOR.
HERMAN G. ADLER
BY
ATTORNEYS

Patented July 29, 1941

2,250,983

UNITED STATES PATENT OFFICE 2,250,983

GOVERNOR

Herman G. Adler, Detroit, Mich., assignor to Novi Equipment Company, Novi, Mich., a corporation of Michigan Application May 6, 1940, Serial No. 333,655

13 Claims. (Cl. 264—3)

The present invention relates to a governor of new design, and is an improvement over the governor shown in my prior copending application, Serial No. 257,557, filed February 20, 1939.

It is an object of the present invention to provide a governor of simplified design adapted to operate between wide limits of speed regulation.

It is more specifically an object of the present invention to provide a novel arrangement of balancing means for balancing the centrifugal force developed by the governor.

It is a further object of the invention to provide a governor in which friction is reduced to a minimum and in which the sensitivity of response is controlled by friction means.

It is a further object of the invention to provide novel friction applying means, which also serve the function of an oil seal.

It is a further object of the invention to provide a governor having a novel relationship between the adjusting lever and the control lever, and a tensioning means interconnecting these levers.

It is a further object of the invention to provide a governor employing chromium plated, unpolished balls.

It is a further object of the present invention to provide a governor employing balls between a pair of rotatably mounted plates, in which the balls are provided with chromium plated surfaces having characteristics such that the friction between the balls and the plates will insure rotation of the plates during operation of the governor.

Other objects of the invention will be apparent as the description proceeds, and when taken in conjunction with the accompanying drawings wherein:

Figure 1 is a side elevation of the governor;

Figure 2 is a vertical section through the governor;

Figure 6:
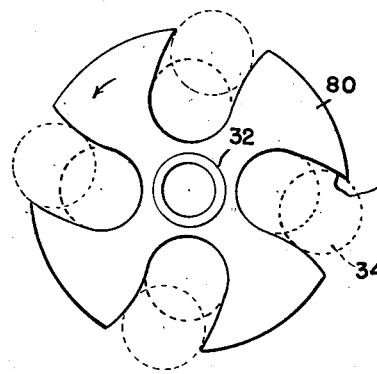
Figure 6 is a detail elevation of the novel driver.

The governor comprising the present invention includes a housing 10, having a flange 11 provided with apertures 12 by means of which the housing is bolted or otherwise secured to appropriate supporting structure. The housing 10 is open at one end and is adapted to be closed by a closure plate 13, appropriately secured in place at the open end of the housing. The closure plate 13 is provided with bearings 14, herein indicated as ball bearings, adapted to support a drive shaft 15. The drive shaft 15 has keyed or otherwise secured thereto a driving gear 16 adapted to be driven from an appropriate member associated with the engine to be governed.

A bushing 17 surrounds the shaft 15 within the inner race of the bearing 14, and supports an annular plate 18 for free rotation on the shaft 15. A second cooperating plate 19 is also carried by the shaft 15 for free rotation and axial movement, and is supported thereon by means of an axially movable bushing 20. A thrust collar 21 having a flange 21' is provided, and ball bearing elements 22 are received between the flange 21' and the plate 19. Both the flange 21' and the plate 19 are provided with shallow grooves for receiving and retaining the balls 22 in position, thus forming a race for the balls.

The plate 19 is indicated as dished in a manner to provide a space between the plates 18 and 19, which is outwardly constricted for a purpose which will presently appear.

Keyed or otherwise secured to the shaft 15 is a driver 30 having generally radial ball receiving slots indicated at 31. I have indicated a supporting sleeve 32 keyed as indicated at 33 to the shaft 15 for supporting the driver 30. Received within the slots 31 and between the plates 18 and 19 are a plurality of balls 34 which, as will be evident, will be driven in rotation by rotation of the shaft 15.

Rotation of the shaft 15 and corresponding rotation of the balls 34, urges the balls outwardly due to the centrifugal force developed. Outward movement of the balls moves the axially movable plate 19 and the associated thrust collar 21 to the left, as seen in Figure 2. This motion is resisted by suitable balancing mechanism, which will now be described in detail.

Figure 3:
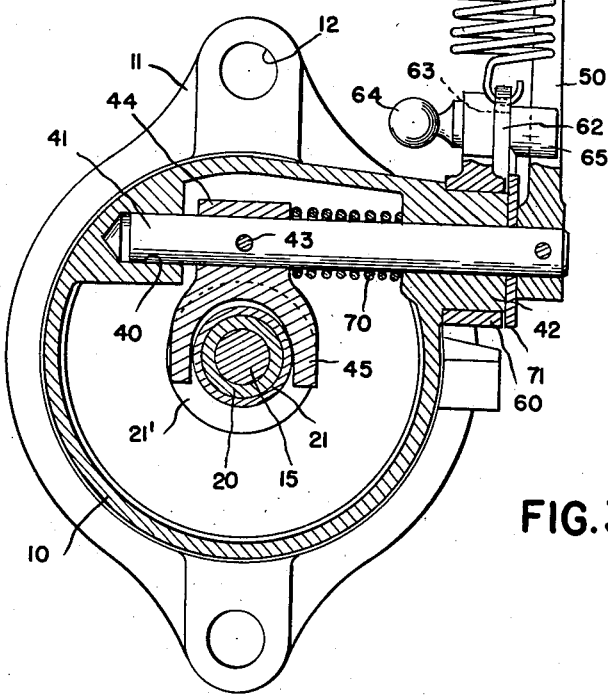
Figure 3 is an end elevation of the governor with parts in section.

The housing 10 is provided interiorly with a recess 40 for receiving one end of a rotatably mounted shaft 41, the shaft extending exteriorly of the casing 10 through an outwardly extending apertured boss 42. Keyed or otherwise secured to the shaft 41, as indicated at 43, is a yoke element 44 having depending arms 45 adapted to engage the flange 21' on the thrust collar. Secured to the externally projecting end of the shaft 41 is a control arm 50, having adjacent its end a ball element 51 adapted to be connected to a link 52, which in turn is connected to means for controlling the position of the throttle (not shown). In Figure 3 I have indicated the link 52 as provided with a hollow sheet metal member 53 shaped to partly embrace the ball element 51, and having a spring-pressed plunger 54 therein, urged by a spring 55 to retain the link 52 connected to the ball 51.

The boss 42 has a cylindrically finished surface on which is mounted, coaxially with the shaft 41, an adjusting lever 60. Tension means are provided interconnecting the levers 50 and 60, and for this purpose the lever 50 is provided adjacent its free end with a laterally extending arm 56, having an eye 57 therein for the reception of a loop of a coil tension spring 58. The lever 60 is provided with a projecting stud 61 on which is pivoted a rigid link element 62, having an eye 63 for the reception of the opposite end of the coil spring 58. Spring 58 and link 62 together make up a spring connection between levers 50 and 60.

The adjusting lever 60 is provided at its free end with a ball 64, similar in all respects to the ball 51 carried by the lever 50, previously described. Suitable manual adjusting means (not shown) are adapted to be connected to the ball 64 for swinging the adjusting arm 60 into predetermined position and for retaining it in this position. As will be appreciated, adjustment of the arm 60 varies the tension and the instantaneous effectiveness of the torque arm of the spring 58 with respect to the control lever 50, and thereby serves as a speed control setting for the governor.

The arms 50 and 60 are axially spaced from each other, but means are provided on one of the arms which is engageable with the other arm, whereby upon swinging of the adjusting arm 60 to limiting position in one direction the control arm 50 will be simultaneously positively moved to a position corresponding to idle position of the throttle. This means takes the form of a projection 65 extending from the arm 60 into the plane of movement of the arm 50 and adapted to engage the arm 50 when the angularity between the arms is reduced to a predetermined amount. The projection 65 serves another important function, as will now be described. As indicated in Figure 1, the projection 65 serves also as an abutment for the rigid link 62, and is adapted when the angularity between the arms 50 and 60 increases to a predetermined amount, to prevent further swinging of the link 62 about the stud 61. This will modify the effectiveness of the spring in a manner which will now be pointed out.

Figure 5:
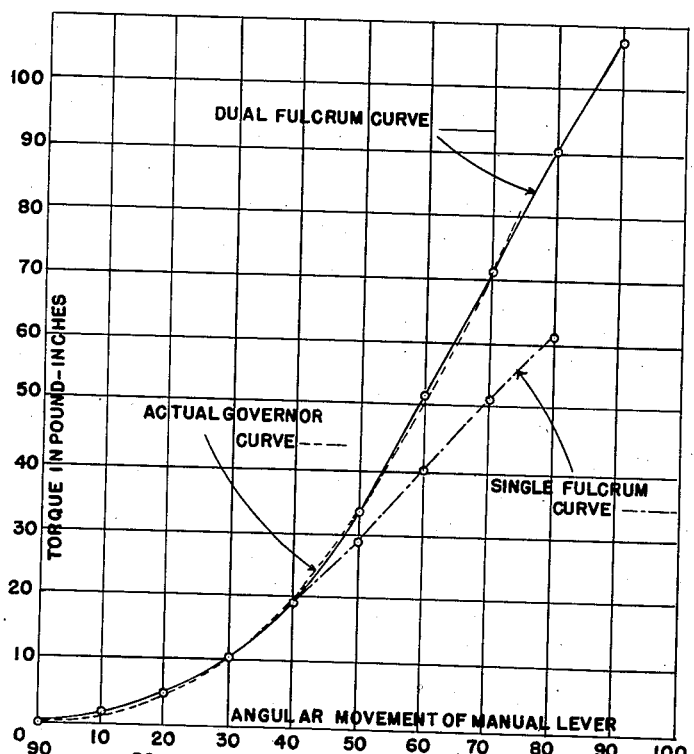
Figure 5 is a chart illustrating the torque developed by the dual fulcrum spring.

As stated at the outset, the present governor is designed to operate through an extraordinarily wide speed range, and accordingly the means for balancing the torque developed by the centrifugal means must correspond to the developed torque throughout a wide range. As indicated in Figure 5, the governor of the type illustrated may have an actual governor curve, as indicated by dotted lines in this figure. If the link 62 and associated cooperating abutment 65 were omitted so that the spring had a single fulcrum, the curve drawn with the broken line and designated "single fulcrum curve" would be obtained. As is apparent, this curve deviates sharply from the actual governor curve, particularly in the high torque range. It would, of course, be possible to modify the spring characteristics and design so as to cause this curve to correspond closely to the actual governor curve in the high torque range, but if this were done the curve would deviate widely from the actual governor curve in the low torque range. By employing the present construction, that is, resilient means comprising the tension spring and pivoted link, together with an abutment to prevent swinging movement of the pivot link upon attainment of a predetermined angularity between the levers, the curve shown in full line and designated "dual fulcrum curve" is obtained. As will be evident, this curve follows closely the actual governor curve throughout the entire range, with the result that close regulation may be obtained throughout an exceedingly wide speed range.

Figure 4:
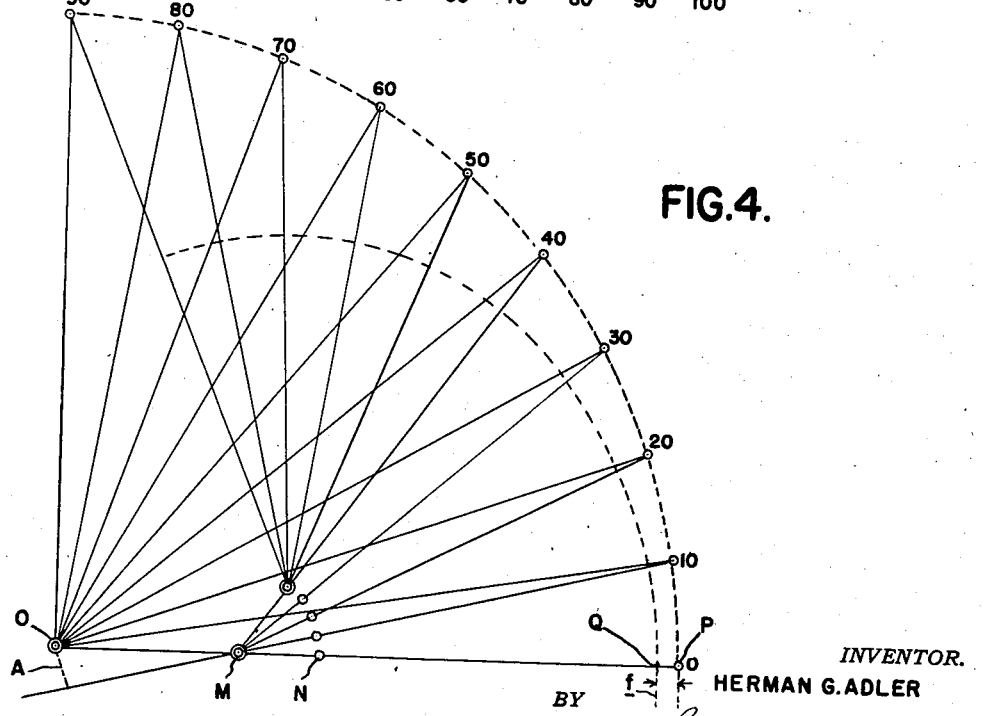
Figure 4 is a diagram indicating the geometry of the dual fulcrum spring employed.

In Figure 4 I have illustrated the geometry involved in what I term the dual fulcrum construction, and in this figure the axis of the shaft 41 is designated at O; the axis of the stud 61 is designated M; the eye 63 in the link 62 is designated at N; and the eye 57 of the arm 56 is designated P. At Q I have indicated the normal or untensioned length of the spring 58 so that the distance between the curves P and Q indicates the elongation of the spring 58.

The diagram in Figure 4 is graduated in degrees from zero to 90°, and a zero degree condition exists when the points O, M, N and P are aligned. In this condition, as will be obvious the spring is stretched by an amount measured by the distance between the curves Q and P at the zero point, but no torque is exerted for the reason that the force of the spring is aligned with the pivot center O. In this figure it is assumed that the abutment 65 is so positioned that it engages the link 62 when the arms 50 and 60 have been separated by an angle of 40°. Therefore, throughout the first 40° of relative angular movement between the arms 50 and 60 the tension means, including the spring 58 and link 62, operate in the usual manner, and the torque developed may be computed if the spring rate is known. Thus, for example, when the angular separation between the arms is 10°, the elongation of the spring may be determined by the separation between the curves Q and P at that point, and the effective torque arm developed is indicated at A, the normal distance between the fulcrum center O and the line of action of the spring.

Throughout the first 40° of relative angular movement the torque increases in the usual manner, there being a continuous increase in elongation in the spring and a continuous increase in the effective lever arm of the spring. As soon as the link 62 engages the abutment 65, conditions are changed, and further separation of the levers results in a more rapidly increasing torque. This will be apparent from Figure 4 in which it will be observed that elongation of the spring as measured between the curves N and P will increase more rapidly, due to the fact that the point N is no longer permitted to swing about the point M as the center. In addition the lever arm A will increase much more rapidly, due to the fact that the line of action of the spring now passes through a fixed point at the upper end of the curve N.

In order that this developed torque curve may be fully understood, I have included below in tabular form an illustrative set of figures. In these figures $\theta$ represents the angle included between the arms 50 and 60; A represents the effective torque arm or the normal distance from the point O to the line of action of the spring;

$f$ represents the elongation of the spring; and $RAf$ represents the torque where $R$ is the assumed or selected spring rate. As will be apparent, this torque, as indicated in the column $RAf$ is that plotted on the chart of Figure 5.

| θ | A | f | RAf |
|---|---|---|---|
| 10 | .242 | .120 | 1.68 |
| 20 | .460 | .180 | 4.82 |
| 30 | .654 | .275 | 10.43 |
| 40 | .812 | .405 | 19.0 |
| 50 | 1.028 | .560 | 33.4 |
| 60 | 1.182 | .755 | 51.8 |
| 70 | 1.267 | .972 | 71.4 |
| 80 | 1.302 | 1.192 | 90.0 |
| 90 | 1.298 | 1.420 | 107.0 |

The depending arms 45 of the yoke 44, which engage the flange 21' of the thrust collar 21, retain the collar 21 against rotation on the bushing 20. As previously stated, the plates 18 and 19 are mounted for free rotation on the shaft 15, and during normal operation they will rotate at the same speed as the balls 34. This is a desirable condition. Since the flange 21' does not rotate, even though balls 22 are provided intermediate this flange and the plate 19, in some cases it is found that the plate 19 does not rotate. This gives rise to unsatisfactory operating conditions and causes considerable noise in the governor. It is accordingly desirable to insure that during normal operation of the governor the plate 19 will rotate.

I have found that this aim can be attained by employing balls having a specific characteristic. Best results are obtained when these balls are plated with chromium and are then left in an unpolished condition. The balls are not, of course, rough, but on the other hand they do not have the smoothness which would follow a polishing operation subsequent to the plating operation.

The essential consideration is that the surface characteristics of the balls 34 must be such that the torque exerted through friction of the balls 34 on the plate 19 shall be greater than the torque exerted through friction of the balls 22 on the plate 19. Friction between the sleeve of the thrust collar 21 and bushing 20 is negligible by reason of a loose fit between these parts.

In addition to providing the requisite friction by chromium plating the balls 34, it is found that this operation further improves the governor operation and increases its life. It has been my experience that where the balls are not chromium plated, it has been difficult, if not impossible, to control the initial surface characteristics of the balls as desired. Furthermore, where the balls are not chromium plated and where the initial surface characteristics are such as to produce the desired operating characteristics, I have found that a governor of this type will not operate satisfactorily through a reasonably long life, due to changes in the surface characteristics of unplated balls. On the other hand, where the balls are chromium plated and provided with the desired surface characteristics, these characteristics are not substantially modified by use in the governor and thus the desired operating characteristics are present throughout the life of the governor.

Referring now to Figure 3, I have illustrated a compression spring 70 surrounding the shaft 41 and abutting against the yoke 44. The yoke 44 is keyed to the shaft 41, as previously described, with the result that the spring 70 urges the shaft 41 to the left as seen in Figure 3. Exteriorly of the boss 42 I provide a friction and sealing plate 71 which is secured against rotation to the shaft 41. The plate 71 may for example be pressed to the shaft 41 for rotation therewith. The end surface of the boss 42 against which the plates abut, may be finished smoothly, and the plate 71 may be hardened and ground. By selecting a spring 70 of sufficient strength, any desired amount of friction within reasonable limits may be introduced.

The governor as a whole is designed so as to reduce friction of the parts to a minimum, with the result that the friction introduced by the friction plate 71 may be substantially all of the friction present in the device. As a result of this, it is possible to control within accurate limits the over-all friction encountered in the operation of the device. It is desirable to introduce friction so as to slow the response of the governor under certain operating conditions. For example, when the governor is applied to a tractor, and where the tractor is pulling a farming implement, such for example as a disk, across a plowed field, there is a rapid succession of impulses. As a result, the governor in many cases will be found to cause undesirable surges in the motor in synchronism with the impulses applied. Under these circumstances, by providing a predetermined amount of frictional resistance to response, the response may be delayed so that these undesirable surges are avoided. The friction thus provided will not, of course, substantially affect the speed range of the governor, and its effect on the closeness of regulation of the governor is unimportant in the use of the governor on a farm tractor.

Instead of employing a hardened and ground plate 71, it may in some instances be preferable to provide a plate of non-metallic material, such for example as a fibrous material. In either case it is found that where this frictional resistance is introduced in the manner specified, it is unnecessary to supply a separate oil seal for preventing leakage of oil from the interior of the governor around the shaft 41. The friction plate is found to perform this oil sealing function in an entirely satisfactory manner.

Figure 7:
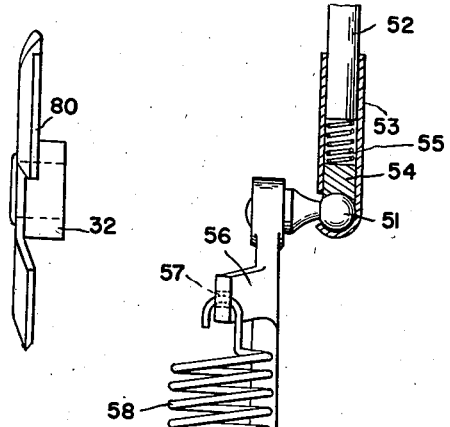
Figure 7 is a side elevation of the driver shown in Figure 6.

Referring now to Figures 6 and 7, I have illustrated a modified form of driver 80, corresponding generally to driver 30 shown in Figure 2. In this case responsiveness of the governor is modified by providing the driver 80 with curved, inclined slots 81 for the reception of balls 34, shown in this figure in dotted lines. Driver 80 is secured to sleeve 32 for rotation with drive shaft 15.

The slots 81 are preferably curved so as to form equal angles with radial lines, or in other words formed as a logarithmic spiral. In practice however this curve may be closely approximated by a circular arc whose center is remote from the axis of the driver.

During constant speed operation, with all parts in equilibrium, the curvature and inclination of the slots do not affect the operation. During acceleration or deceleration, however, the inclination of the slots affects the sensitivity of the governor. Thus for example with the slots inclined rearwardly from the direction of rotation as shown by the arrow in Figure 6, the inclination of the slots aids outward movement of the balls during acceleration, and aids inward movement of the balls during deceleration. As will be obvious, this renders the governor more responsive to speed changes. If the slots were oppositely inclined, the governor's responsiveness would be retarded, thus serving a purpose similar to friction member 11 previously described.

By curving the slots at a substantially uniform angle to the radial lines, the effectiveness of the slots for the purpose set forth is kept substantially constant for all positions of the balls.

It is further within the scope of the invention to provide the slots so as to make different angles with radial lines so as to affect the sensitivity in a predetermined manner for different positions of the balls between balls-in and balls-out position.

While I have illustrated and described a specific embodiment of my governor, it will be apparent that this has been done solely to enable those skilled in the art to practice the invention, the scope of which is indicated by the appended claims.

What I claim as my invention is:

1. A wide range governor comprising centrifugal means, spring balancing means including a lever movable by said centrifugal means, a tension spring opposing movement of said lever, a link connected to one end of said spring, and an abutment engageable during swinging of said lever by said link.

2. A wide range governor comprising centrifugal means, spring balancing means including a lever movable by said centrifugal means, an adjusting lever, resilient means connecting said levers and including a tension spring connected to one of said levers and a link pivotally connected to the other lever, an abutment carried by said other lever and engageable by said link during relative swinging movement of said levers.

3. In a governor, a control lever pivoted for swinging movement, centrifugal means for swinging said control lever, an adjusting lever pivoted coaxially with said control lever, resilient means connecting said levers and adapted to oppose swinging of said control lever by said centrifugal means, said resilient means comprising a tension spring and a link pivoted to one of said levers, and an abutment carried by said one lever adapted to engage said link during relative swinging movement of said levers to vary the effectiveness of said resilient means.

4. In a governor, a control lever pivoted for swinging movement, centrifugal means for swinging said control lever, an adjusting lever pivoted coaxially with said control lever, resilient means connecting said levers and adapted to oppose swinging of said control lever by said centrifugal means, said resilient means comprising a tension spring and a link pivoted to one of said levers, and an abutment carried by said one lever adapted to engage said link during relative swinging movement of said levers to vary the effectiveness of said resilient means, said abutment being positioned so as to increase the effectiveness of said resilient means at and beyond a definite spring torque.

5. A governor comprising a casing, a shaft extending through an opening in a wall of said casing, centrifugal means on said casing operable to rotate said shaft, and friction means opposing rotation of said shaft, said friction means comprising a friction washer secured to said shaft, and resilient means urging said washer into contact with said casing.

6. A governor comprising a casing, a shaft extending through an opening in a wall of said casing, centrifugal means on said casing operable to rotate said shaft, and friction means opposing rotation of said shaft, said friction means comprising a friction washer secured to said shaft, and resilient means urging said washer into contact with said casing, said washer serving as an oil-seal for said opening.

7. A governor comprising a casing, a shaft extending through an opening in a wall of said casing, centrifugal means on said casing operable to rotate said shaft, and friction means opposing rotation of said shaft, said friction means comprising a friction washer secured to said shaft externally of said casing, and resilient means urging said washer into contact with said casing.

8. In a governor of the type described, a manual adjusting lever and a control lever pivoted concentrically, centrifugal means acting to effect a swinging movement of said control lever, tension means interconnecting said levers and opposing said swinging movement of said control lever by said centrifugal means, said tension means connected to said control lever remote from its pivot axis and connected to said adjusting lever relatively closer to said pivot axis.

9. In a governor of the type described, a manual adjusting lever and a control lever pivoted concentrically, centrifugal means acting to effect a swinging movement of said control lever, tension means interconnecting said levers and opposing said swinging movement of said control lever by said centrifugal means, said tension means connected to said control lever remote from its pivot axis and connected to said adjusting lever relatively closer to said pivot axis, said tension means comprising a tension spring, and a link, said link being pivoted to said adjusting lever, and an abutment on said adjusting lever adapted to prevent swinging of said link on said adjusting lever when the angle between said levers is increased to a predetermined maximum.

10. In a governor of the type described, a manual adjusting lever and a control lever pivoted concentrically, centrifugal means acting to effect a swinging movement of said control lever, tension means interconnecting said levers and opposing said swinging movement of said control lever by said centrifugal means, said tension means connected to said control lever remote from its pivot axis and connected to said adjusting lever relatively closer to said pivot axis, said tension means comprising a tension spring, and a link, said link being pivoted to said adjusting lever, and an abutment on said adjusting lever adapted to prevent swinging of said link on said adjusting lever when the angle between said levers is increased to a predetermined maximum, said abutment extending into the plane of motion of said control lever whereby said adjusting lever may engage and positively move said control lever to idle position.

11. A wide range governor comprising centrifugal means, spring balancing means for said centrifugal means including a lever movable by said centrifugal means, a tension spring connection opposing movement of said lever by said centrifugal means, and an abutment engageable by said spring connection intermediate its ends upon movement of said lever by said centrifugal means, said spring connection and abutment being constructed and arranged to cause the torque exerted by said spring connection to increase at a faster rate upon further movement of said lever by said centrifugal means.

12. A wide range governor comprising centrifugal means, spring balancing means for said centrifugal means including a lever movable by said centrifugal means, a tension spring connected at one end to said lever, the opposite end of said spring being swingable in a circular arc about an axis eccentric to the pivot axis of said lever and effective during low speed operation to provide a variable torque by simultaneous changes in spring tension and torque arm, and means effective in the high speed range to retain said opposite end of said spring stationary.

13. A governor comprising a casing, a drive shaft therein, centrifugal means driven by said shaft, a control lever operable by said centrifugal means and spring means opposing movement of said lever by said centrifugal means, antifriction means for reducing the friction of said centrifugal means, and separate friction means opposing movement of said lever, whereby overall sensitivity of said governor may be substantially determined by determining the effectiveness of said separate friction means.

HERMAN G. ADLER.